United States Patent Office.

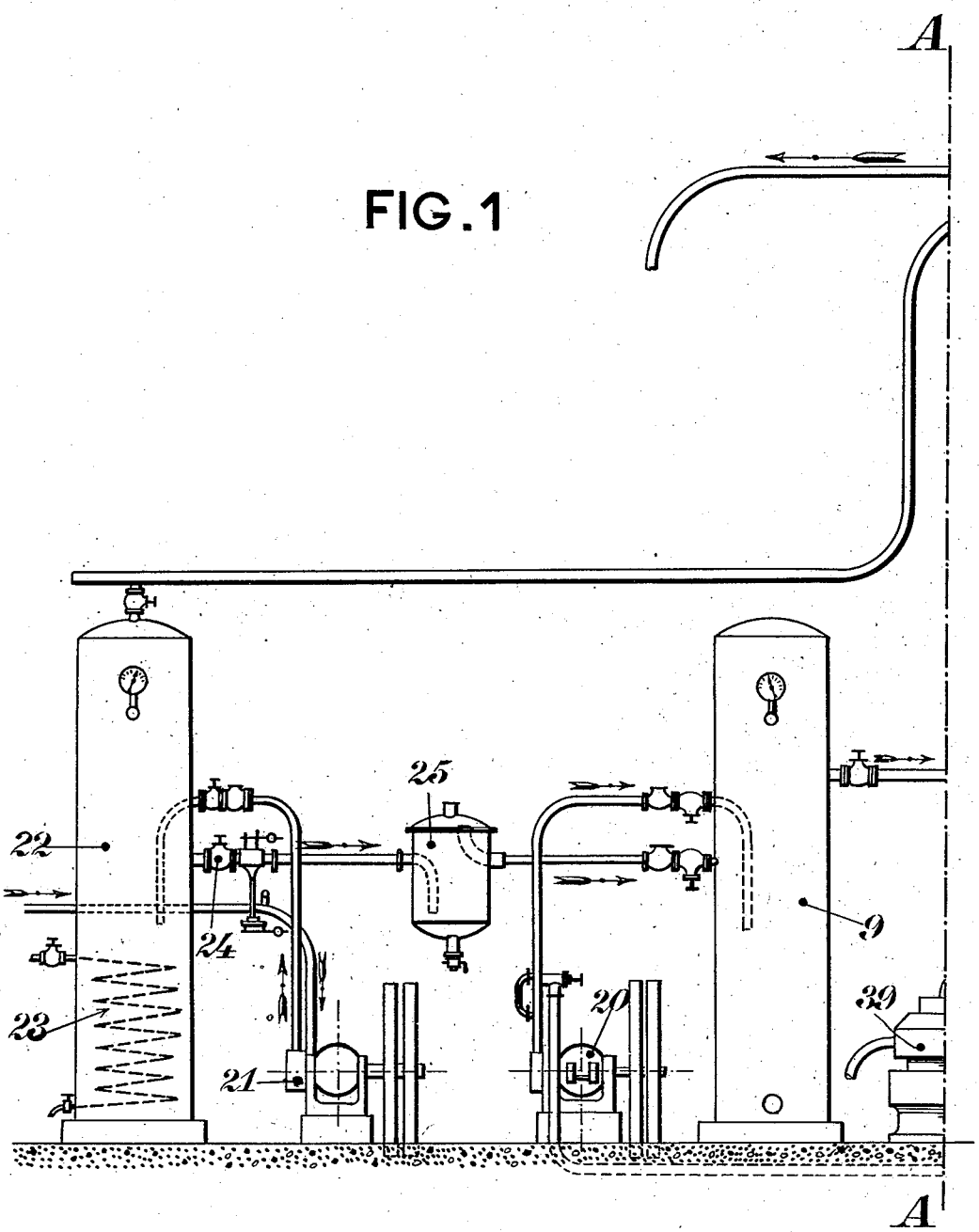

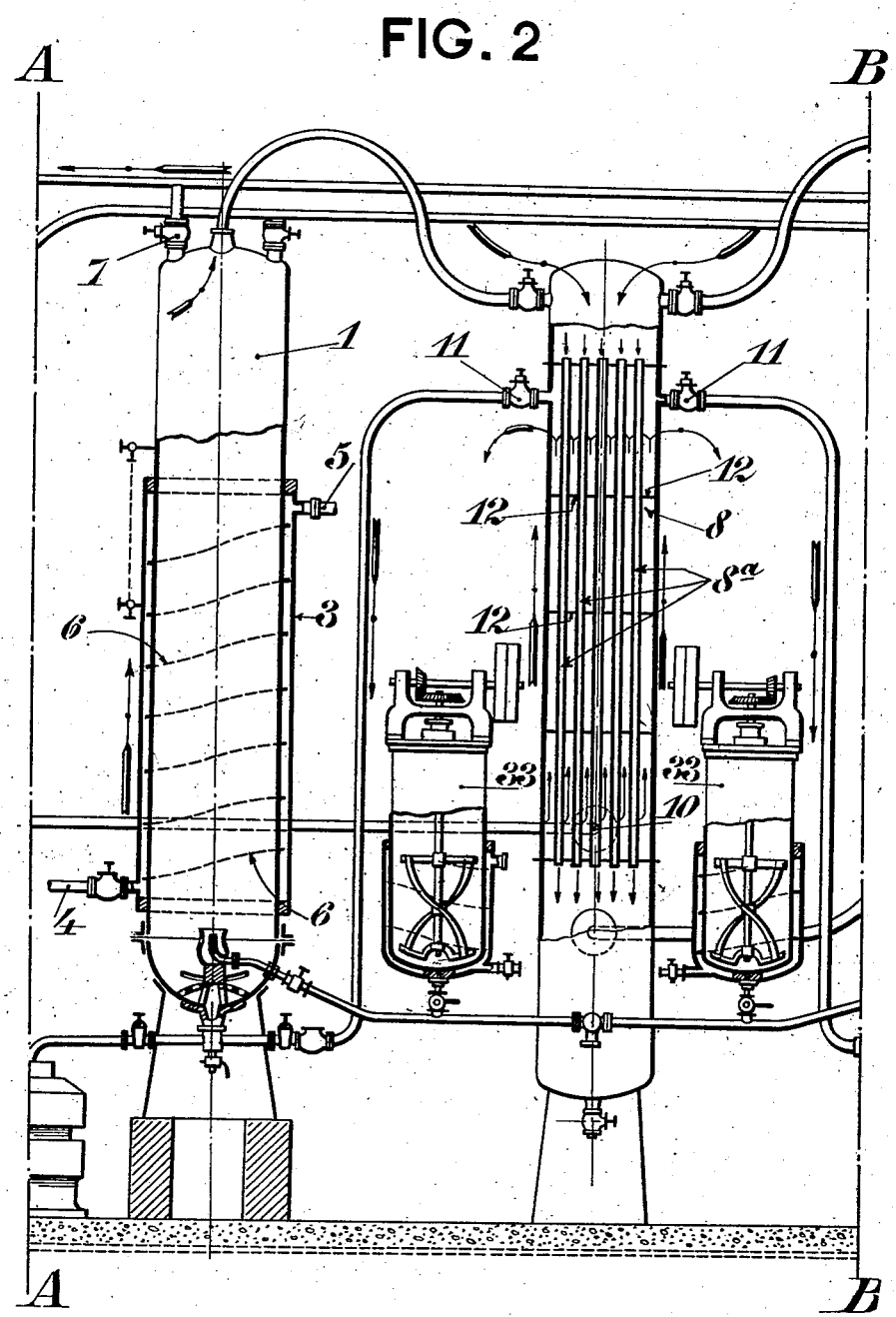

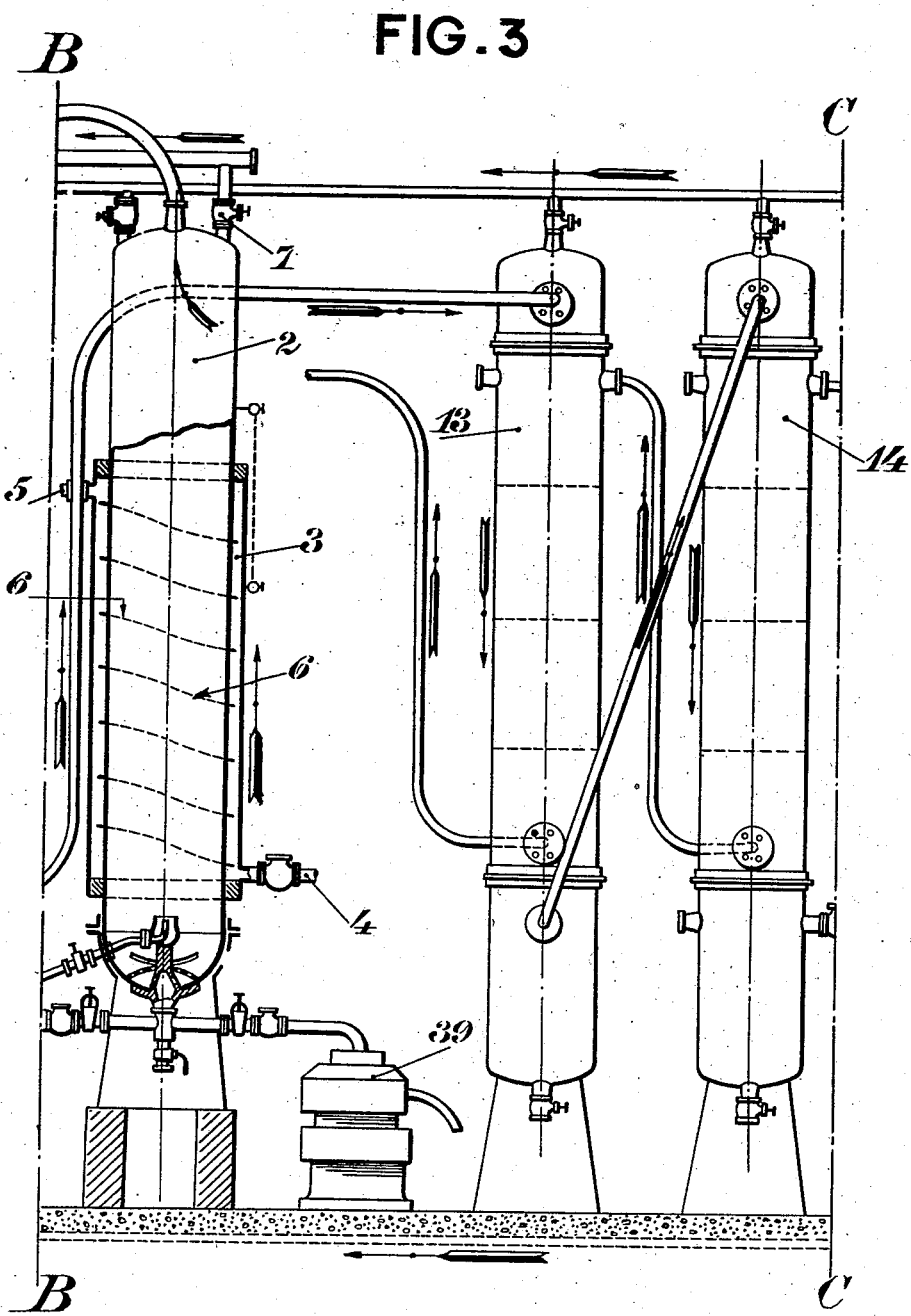

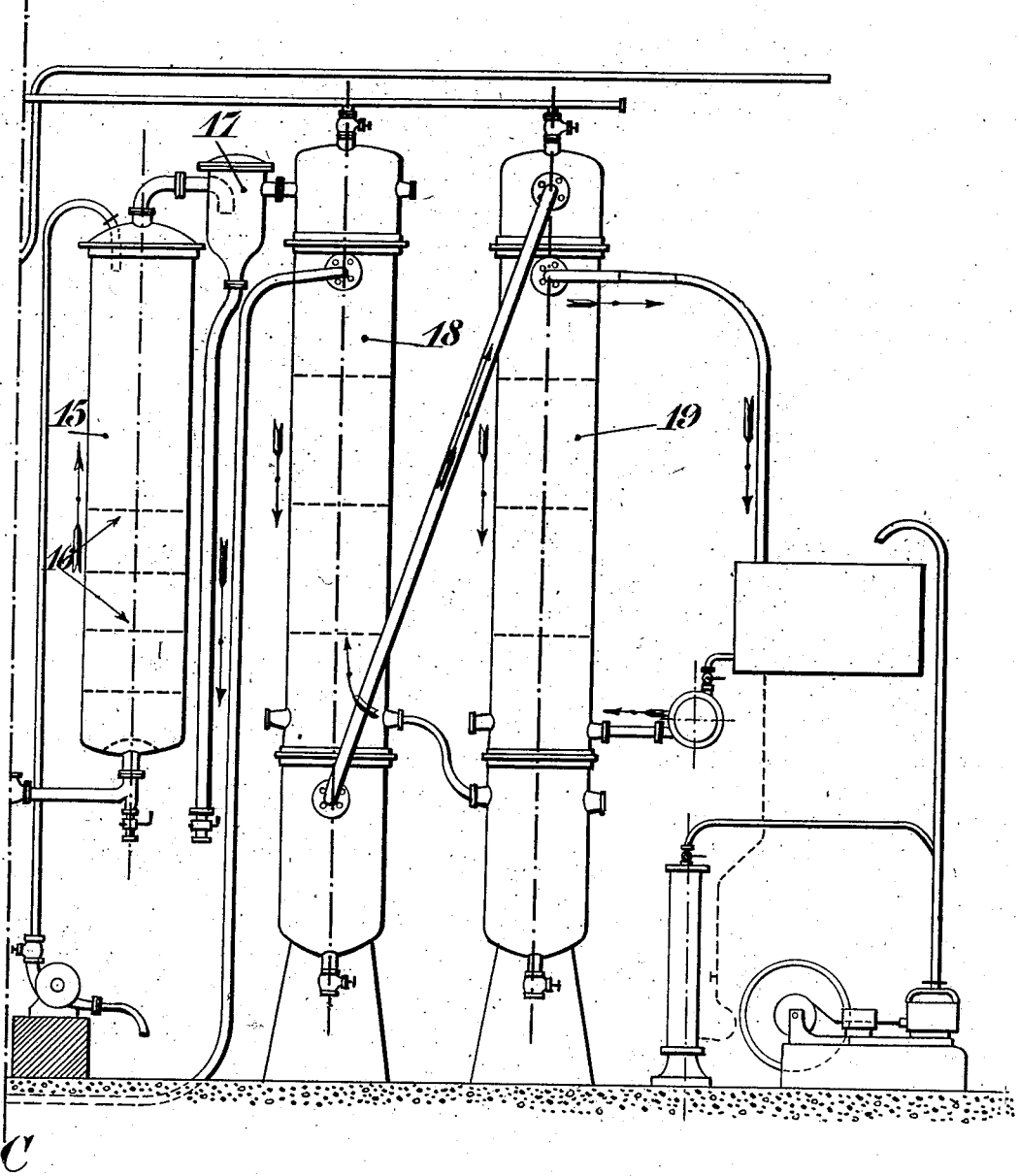

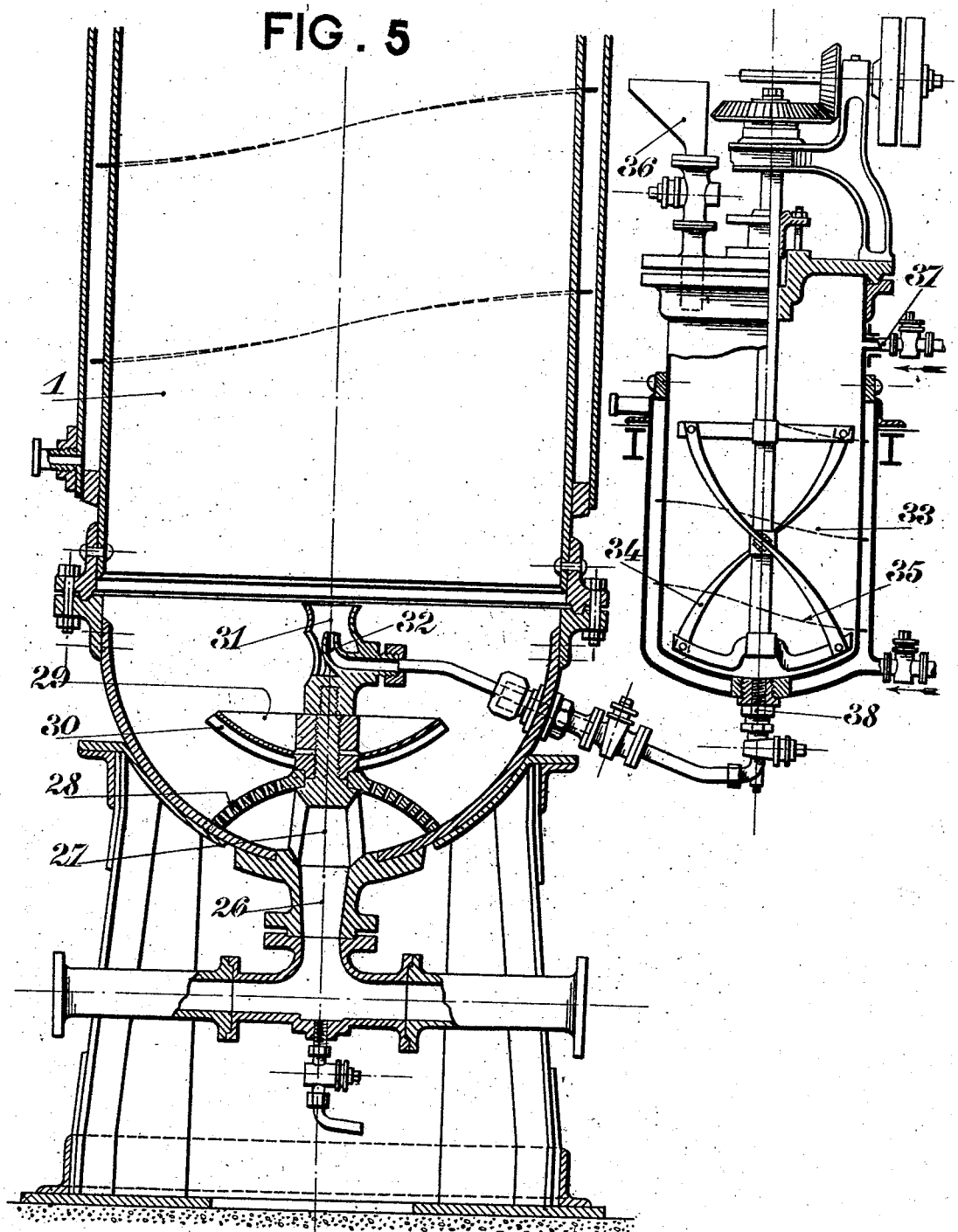

AUGUSTIN RADISSON AND PAUL BERTHON, OF LYON, FRANCE; SAID RADISSON ASSIGNOR TO SOCIETE DE STEARINERIE ET SAVONNERIE DE LYON, OF LYON, FRANCE.

METHOD OF AND APPARATUS FOR HYDROGENATING FATTY ACIDS AND THEIR GLYCERIDS.

1,353,419.

Specification of Letters Patent. Patented Sept. 21, 1920.

Application filed June 21, 1917. Serial No. 176,181.

*To all whom it may concern:*

Be it known that we, AUGUSTIN RADISSON and PAUL BERTHON, both citizens of the French Republic, and residents of Lyon, in France, have invented a certain new and useful Method of and Apparatus for Hydrogenating Fatty Acids and Their Glycerids, of which the following is a specification.

This invention relates to a method for the saturation by means of hydrogen of unsaturated fatty acids and their glycerids and apparatus therefor.

Numerous catalytic processes have been suggested for the saturation by hydrogen of unsaturated fatty acids and their glycerids.

The many difficulties encountered in practice arise either from the catalyzer itself or from the defective conditions of its employment.

The object of the present invention is to obtain, with a given catalyzer, a rational, rapid and complete hydrogenation.

It is known that apart from the catalyzer itself three causes may affect the speed of a reaction i. e. the pressure, the temperature, and the mixture of reagents.

Various known processes already made known indicate the most variable temperatures (70° to 230° C.) and working pressures (2 to 15 kilos). Difficulties in the construction of an apparatus for the use of hot hydrogen at high pressure lead to the neglect of the latter factor for increasing the speed of reaction.

Now since an object of the invention is to obtain the maximum speed of reaction, and any isothermic reaction at constant pressure being a reaction at decreasing speed, the temperature of the reagents must be progressively raised in the course of the operation.

Under these conditions, in order to avoid the extremely injurious reactions of hydrolysis and obtain products of special purity,—in particular products intended for food—the hydrogen is purified and dried in a thorough manner by a suitable process, for instance an energetic cooling to about −20° C.

Moreover, although hydrogen has relatively a very slight density, still after having passed through a mixture of glycerids and free fatty acids not completely saturated it carries with it a certain quantity of the most volatile products, which are actually the fatty acids. Consequently, if the saturation is effected on glycerids containing a small proportion of fatty acids, almost the whole of these latter will be eliminated during the time (averaging three hours) of operation of hydrogenation; if, on the contrary, fatty acids are treated which are not completely saturated and which form the most important part of the substance treated, the other compounds being in small proportion in relation to the fatty acids treated, a small part only of these fatty acids can be carried away by the surplus hydrogen which leaves the apparatus, these fatty acids extracted will be completely saturated in the presence of the hydrogen which carries them out of the digester and they can then be condensed in a hydrogen purifying apparatus, while the greater part of the fatty acids will be saturated in the digester itself. The process therefore allows glycerids to be purified which contain a slight proportion of fatty acid without preventing efficacious and economical treatment of the fatty acids containing or not containing impurities. In both cases, the fatty acids extracted, the quantity of which depends only on the amount of surplus hydrogen passing through the apparatus, are condensed in the purifier or retained by caustic soda, before again putting the surplus hydrogen in circulation.

With hydrogen thus absolutely dry and pure, almost the whole of the fatty acids contained as impurities in a given amount of glycerids will be distilled at the temperatures and pressures contemplated. Starting with products containing 4 to 6 per cent. of acidity these products after treatment will be found to contain no more than 0.5 per cent. of acid at the most, and not contain any dissolved catalyzing metal. Consequently, the long and troublesome operations of neutralization will be avoided.

Further, the fatty acids extracted are condensed in a suitable apparatus either to the free state or a state of chemical combination as hereinbefore indicated.

The contact between the reagents is regulated according to the working temperature. At the temperatures proposed, the colloidal solution of the catalyzer in the oils or fatty acids is quickly destroyed, especially in the latter. In order to prevent this, the catalyzer is progressively injected in a suitable form in proportion as the reaction tends to slacken. Thus the amount of catalyzing agent is constantly increased in the apparatus as the proportion of unsaturated glycerids or fatty acids diminishes, which maintains to a sufficient amount the number of contacts in the unit of volume of matter under treatment.

1. The addition of catalyzer is effected at the rate of progress of the reaction, by means of the apparatus 33. Into this apparatus 33 can be introduced the amount of catalyzer sufficient for an operation, and the catalyzer can be injected gradually by means of the hydrogen under pressure, so as to progressively increase the proportion of catalyzer. It can thus be worked with proportions of nickel varying from 0.1% to 1%.

In the accompanying drawings, Figures 1, 2, 3 and 4 illustrate in elevation (parts being shown in section) a combination apparatus suitable for carrying out the improved process and particularly for products intended for food. In the drawings Fig. 2 is a continuation of Fig. 1 from the dotted line A—A. Fig. 3 is a continuation of Fig. 2 from line B—B and Fig. 4 a continuation of Fig. 3 from line C—C.

Fig. 5 is a detail view on a larger scale of a digester.

The digesters 1 and 2 working alternately or in parallel are heated by means of a double casing 3 around which circulates a suitable caloric vehicle (superheated steam, heavy oils, vaseline) which enter at 4 and pass out at 5 and is distributed by means of a series of partitions 6. The rate of admission of this heating agent to the jacket is so regulated, by means of the inlet valve, that the required progressive raising of the temperature is obtained.

The oils to be hydrogenized, introduced through the pipe 7 into one of the digesters are brought to the priming reaction temperature varying as the case may be from 180° to 220° C. The hydrogen is then forced by means of the compressor 20 into the bottom of the apparatus at a pressure just sufficient to overcome the resistance of the oil and of the condensing and washing apparatus (about 1 kilo).

The unabsorbed gas escapes at the top of 1 and passes into the temperature exchanger 8, comprising a simple tubular group $8^a$ where it imparts its heat to the hydrogen coming from the reservoir 9 which, introduced at 10, issues at 11. The plates 12 distribute the gas uniformly around the tubes $8^a$. This exchanger serves as to automatically regulate the temperature of the hydrogen introduced into the digesters. In fact, during the reaction of hydrogenation, which discharges with certain oils large quantities of heat, the greater part of the hydrogen is instantaneously absorbed. The amount of hydrogen passing out being inconsiderable with respect to the amount of hydrogen entering, the temperature falls automatically in the apparatus 8 which thus serves to prevent sudden increases of temperature. In leaving the digester 1 the hydrogen carries with it a large amount of free fatty acids. The latter are condensed firstly in the temperature exchanger 8 and then in tubular condensers 13, 14 regularly cooled, the water having circulated in 14 then entering into 13.

This distillation of the fatty acids carried off by the dry hydrogen enables the operations of neutralization to be dispensed with in the case of alimentary fats.

On leaving the condensers the gas passes through the chamber 15 provided with perforated plates 16 and containing caustic soda, which absorbs certain volatile impurities of the oils. The hydrogen passing out from the chamber 15 is freed, in the water separator 17, from the liquid mechanically acquired.

Finally, in order to eliminate the last traces of impurities and at the same time bring the gas to the condition of absoluted desiccation, it is caused to circulate in a temperature exchanger 18 of the same type as the apparatus 8 where its temperature is equalized to that of the gas passing out from the cooler 19.

It then passes into the cooler itself, composed of an ordinary tubular group, cooled by means of a suitable process to the temperature of —20°. The amount of cold to be supplied to the gas being very small a small refrigerator will be sufficient to give suitable results. The apparatus shown for this purpose in Fig. 4 comprises a carbon dioxid or sulfurous acid ice machine 41, a condenser 42 for the liquefied gas, a tank 43 for the refrigerating solution, and a pump 44 connected by a pipe 45 to the cooler 19.

The gas on leaving the cooler 19 circulates in the jacket of the apparatus 18 around the tubular group and is warmed in contact with the gas flowing from the purifier.

This hydrogen thus freed from all traces of moisture and impurities is sucked in by the compressor 20 and again driven into the digesters. The gas absorbed during the reaction is replaced by pure gas supplied, for instance, by an electrolysis battery. This added gas is compressed to 20 kilos by the compressor 21 in a reservoir 22 cooled by means of the circulation of water in a serpentine pipe 23.

This compressed hydrogen is thus absolutely dry, as the water condenses in the bottom of the reservoir. It is introduced by means of an expander 24 into the reservoir 9 in passing through a water separator 25, which serves to collect the traces of water which might be mechanically carried along.

Fig. 5 shows the device employed to insure perfect contact between the reagents, at the same time as the progressive and methodical distribution of the catalyzer.

The hydrogen is introduced through the conic tube 26 in the bottom of the digester 1 and distributed by a lantern-pipe 27 with four openings and passes through the holes of the sprinkler 28. It breaks against the parabolic member 29 provided with helicoidal blades 30 imparting a helical movement to the mixture of gas and oil. Above the member 29 is an injector 31 in which the catalyzer mixture is introduced through the nozzle 32. This mixture is prepared in the apparatus 33, which has a double bottom heated by steam to about 180° C. and provided with an energetic agitating device formed by paddles 34 and helical counter-baffles 35.

The reduced catalyzing metal is introduced through the funnel 36 and by the pressure of hydrogen conducted through a tube 37 the catalytic mixture is forced through the lower tube 38 into the injector 31.

Owing to this device the catalyzer can be methodically introduced and the course of the reaction thus regulated. This progressive addition has moreover the advantage of maintaining the colloidal solution of the catalyzer in the oil and consequently perfect contact between the reagents.

The catalyzer when freed from the oil by any means (a drier 39 Fig. 3 for instance), can be used many times.

Example I: 5,000 kilos of soy oil of 0.7 acidity are introduced into the digester and heated to 200° C. After starting the gaseous current the catalyzer is introduced little by little. The reaction is started and the temperature is raised by degrees while large quantities of hydrogen are absorbed.

Thus in three hours a product is obtained attaining 54° of fusion point. The temperature has been able to rise during the course of the reaction up to 300° C. The proportion of catalyzer employed has not exceeded 0.5 per cent. 650 m³ of hydrogen has been absorbed and the acidity of the product hardly attains 0.2.

Example II: 5,000 kilos of whale oil of 2.5 of acidity, are introduced into the digester which is heated to 170° C., at which temperature the addition of the catalyzer is commenced.

Any suitable heating means may be employed which allow the temperature of the oil to be varied within the limits of 180° to 250° C.

The initial temperature is 170° C. and at first rises from the fact of the reaction itself during a rather short period of time: then it is gradually raised by the addition of external heat and by the course of the reaction, up to the temperature of about 260° C. The reaction is very violent at the commencement and tends to become quieter but is revived by the proper quantities of catalyzer not exceeding 0.6 per cent. of the oil. In three hours a fusion point of 47° C. is obtained, titrating 0.4% of acidity and the product is suitable for alimentation. 500 m³ of hydrogen has been absorbed.

What we claim as our invention and desire to secure by Letters Patent of the United States is:—

1. In the process of saturating unsaturated fatty acids or their glycerids by means of hydrogen in the presence of a catalyzer, maintaining a constant speed of reaction by the progressive addition of external heat, and increasing the amount of catalyzer as the proportion of unsaturated fatty acids or glycerids decreases.

2. In apparatus for saturating unsaturated fatty acids or their glycerids by means of hydrogen the combination of a digester, a double jacket therefor, means for the introduction of a heating agent into said jacket, a vertical chamber horizontal gas distributing plates in said chamber, open ended vertical tubes in said chamber passing through said plates a hydrogen supply conduit connected to said chamber above the lower end of said tubes, a hydrogen conduit connecting the lower part of the digester to said chamber below the upper end of said tubes, and a hydrogen conduit connecting the upper part of the digester to said chamber above the upper ends of said tubes.

3. An apparatus for the saturation of unsaturated fatty acids and their glycerids by means of hydrogen, comprising a digester, means for heating said digester, means for introducing the oils to be hydrogenized into said digester, means for introducing hydrogen under pressure into said digester, and means for automatically regulating the temperature of the hydrogen introduced into said digester, means for the outlet of the hydrogen containing fatty acids from said digester, means for condensing said fatty acids, means for absorbing volatile impurities in the fatty acids, means for drying and cooling said hydrogen, means for again warming said hydrogen, means for reintroducing said hydrogen into said digester and means for the progressive introduction of the catalyzer to said digester.

4. An apparatus for the saturation of unsaturated fatty acids and their glycerids by means of hydrogen, comprising a digester, a double jacket therefor, means for the introduction and outlet of a heating agent into said double jacket, means for introducing the oils to be hydrogenized into said digester, a conic pipe for the introduction of the hydrogen at the bottom of the said digester, a sprinkling plate in said digester, a parabolic member therein, means for automatically regulating the temperature of the hydrogen introduced into said digester, comprising a vertical chamber, vertical open-ended tubes in said chamber, plates for distributing the hydrogen gas in said chamber, and means for the introduction into and outlet of the gas from said chamber: means for the outlet of the hydrogen containing fatty acids from said digester, means for condensing said fatty acids, means for absorbing volatile impurities in the fatty acids, means for drying and cooling said hydrogen, means for again warming said hydrogen, means for reintroducing said hydrogen into said digester, a chamber for the catalyzer mixture, means for introducing the catalyzing metal into said last mentioned chamber, means for heating said chamber, an agitating device in said chamber and means for conveying the catalytic mixture from said chamber into said digester.

In witness whereof we have signed this specification in the presence of two witnesses.

AUGUSTIN RADISSON.
PAUL BERTHON.

Witnesses:
JEAN GERMAIN,
MARIN VACHON.